(12) United States Patent
Weingartner et al.

(10) Patent No.: US 8,096,528 B2
(45) Date of Patent: Jan. 17, 2012

(54) CHAIN SPROCKET WITH INCREASED LOAD CAPACITY

(75) Inventors: Jurgen Weingartner, Kocherstetten (DE); Manfred Finzel, Kunzelsau (DE); Volker Dietrich, Neuenstein (DE)

(73) Assignee: Konecranes Plc, Hyvinkää (FI)

( * ) Notice: Subject to any disclaimer, the term of this patent is extended or adjusted under 35 U.S.C. 154(b) by 425 days.

(21) Appl. No.: 12/376,077

(22) PCT Filed: May 25, 2007

(86) PCT No.: PCT/EP2007/004670
§ 371 (c)(1),
(2), (4) Date: Jul. 1, 2009

(87) PCT Pub. No.: WO2008/014835
PCT Pub. Date: Feb. 7, 2008

(65) Prior Publication Data
US 2010/0006808 A1    Jan. 14, 2010

(30) Foreign Application Priority Data
Aug. 1, 2006   (DE) .......................... 10 2006 036 162

(51) Int. Cl.
*B66D 1/20* (2006.01)
(52) U.S. Cl. ........ 254/358; 254/372; 474/155; 474/152; 474/164; 474/154; 474/206
(58) Field of Classification Search ............. 254/358, 254/372; 474/152, 155, 164, 154, 206
See application file for complete search history.

(56) References Cited

U.S. PATENT DOCUMENTS

| | | | | |
|---|---|---|---|---|
| 4,343,614 A | * | 8/1982 | Schulte | 474/155 |
| 4,473,364 A | * | 9/1984 | Roling | 474/164 |
| 4,501,577 A | * | 2/1985 | Roling et al. | 474/155 |
| 5,275,379 A | * | 1/1994 | McAleer | 254/372 |
| 7,284,745 B2 | * | 10/2007 | Keane et al. | 254/372 |
| 8,038,558 B2 | * | 10/2011 | Klabisch et al. | 474/155 |
| 2005/0170924 A1 | * | 8/2005 | Meya et al. | 474/155 |
| 2007/0042850 A1 | * | 2/2007 | Klabisch et al. | 474/206 |
| 2009/0309083 A1 | * | 12/2009 | Weingartner | 254/358 |
| 2010/0016107 A1 | * | 1/2010 | Klabisch et al. | 474/155 |

FOREIGN PATENT DOCUMENTS

| | | |
|---|---|---|
| DD | 244609 A1 | 4/1987 |
| DE | 6921196 U | 8/1969 |
| DE | 3201210 A1 | 7/1983 |
| DE | 8631190 U1 | 2/1987 |
| DE | 4130073 A1 | 3/1993 |
| EP | 0505019 A1 | 9/1992 |

* cited by examiner

*Primary Examiner* — Emmanuel M Marcelo
(74) *Attorney, Agent, or Firm* — Leydig, Voit & Mayer, Ltd.

(57) ABSTRACT

A chain sprocket for link chains, for example, round link chains or profiled steel chains, has chain pockets for horizontal chain links. Chain pockets for vertical chain links are also provided. The chain pockets for the vertical chain links are separated from one another by teeth. The tooth flank surface of the tooth that a vertical chain link contacts under the effect of a load is dimensioned and profiled in a special manner. The dimensioning is such that up to a defined chain load the vertical chain link does not contact the tooth flank with its nose. A contact between the tooth flank surface and the nose of the respective chain link occurs only above a defined chain load.

29 Claims, 8 Drawing Sheets

| Wire thickness | Link width | Radius Outer contour | Link length | Tooth height 0.6 d | Radius Tooth flank | Radius tooth flank as a multiple of the wire thickness | Bearing angle in degrees | Starting point Tooth radius | Pocket number Chain sprocket Defecting roller | Slit width at ½" d |
|---|---|---|---|---|---|---|---|---|---|---|
| 4 | 13.6 | 6.8 | 19.80 | 2.4 | 7.06 | 0.26 | 45.00 | 3.10 | 4 | 0.0781 |
| 4.8 | 16.2 | 8.1 | 21.68 | 2.88 | 8.41 | 0.22 | 54.00 | 2.83 | 5 | 0.1306 |
| 5 | 17 | 8.5 | 25.75 | 3 | 8.82 | 0.21 | 54.00 | 4.38 | 5 | 0.1371 |
| 6 | 20.3 | 10.15 | 30.30 | 3.6 | 10.54 | 0.17 | 54.00 | 5.00 | 5 | 0.1637 |
| 6.8 | 23 | 11.5 | 31.06 | 4.08 | 11.94 | 0.15 | 54.00 | 4.03 | 5 | 0.1855 |
| 7 | 24.2 | 12.1 | 35.55 | 4.2 | 12.56 | 0.15 | 54.00 | 5.68 | 5 | 0.1952 |
| 9 | 30.4 | 15.2 | 44.55 | 5.4 | 15.78 | 0.12 | 45.00 | 7.08 | 4 | 0.1746 |
| 11.3 | 36.6 | 18.3 | 53.24 | 6.78 | 19.00 | 0.09 | 54.00 | 8.32 | 5 | 0.2952 |
| 6.3 | 20.95 | 10.475 | 31.14 | 3.78 | 10.87 | 0.16 | 54.00 | 5.09 | 5 | 0.1690 |
| 6.3 | 21 | 10.5 | 31.24 | 3.78 | 10.90 | 0.16 | 54.00 | 5.12 | 5 | 0.1694 |
| 6.45 | 21.4 | 10.7 | 31.08 | 3.87 | 11.11 | 0.16 | 54.00 | 4.84 | 5 | 0.1726 |
| 6.3 | 21.45 | 10.725 | 30.99 | 3.78 | 11.13 | 0.16 | 54.00 | 4.77 | 5 | 0.1730 |
| 7.1 | 23.5 | 11.75 | 34.25 | 4.26 | 12.20 | 0.15 | 54.00 | 5.37 | 5 | 0.1895 |
| 7.8 | 25.7 | 12.85 | 35.81 | 4.68 | 13.34 | 0.13 | 54.00 | 5.06 | 5 | 0.2073 |
| 7.9 | 26 | 13 | 37.11 | 4.74 | 13.49 | 0.13 | 54.00 | 5.55 | 5 | 0.2097 |
| 7.9 | 26.15 | 13.075 | 37.01 | 4.74 | 13.57 | 0.13 | 54.00 | 5.43 | 5 | 0.2109 |
| 7.95 | 26.3 | 13.15 | 39.60 | 4.77 | 13.65 | 0.13 | 54.00 | 6.65 | 5 | 0.2121 |
| 9.95 | 33 | 16.5 | 49.35 | 5.97 | 17.13 | 0.10 | 54.00 | 8.18 | 5 | 0.2661 |
| 11.1 | 35.7 | 17.85 | 52.10 | 6.66 | 18.53 | 0.09 | 54.00 | 8.20 | 5 | 0.2879 |
| 12.45 | 41.1 | 20.55 | 62.78 | 7.47 | 21.33 | 0.08 | 54.00 | 10.84 | 5 | 0.3315 |

Figure 8

CHAIN SPROCKET WITH INCREASED LOAD CAPACITY

CROSS-REFERENCE TO RELATED APPLICATIONS

This patent application is the national phase of PCT/EP2007/004670, filed May 25, 2007, which claims the benefit of German Patent Application No. DE 10 2006 036 162.8, filed Aug. 1, 2006.

FIELD OF THE INVENTION

The present invention relates generally to a chain sprocket for driving link chains.

BACKGROUND OF THE INVENTION

So-called round link chains are composed of concatenated individual round links. Respective adjacent chain links are rotated by 90° with respect to one another relative to the longitudinal axis of the chain. Each chain link of a round link chain consists of a bent wire section, the free ends of which are butt-welded to one another.

In a plan view onto the flat side, the chain link consists of two straight mutually parallel sections, both transitioning at each end into semicircular arcs. The radius of the two semicircular arcs corresponds to the center separation of the straight sections. The projection of such a flat-lying chain link onto a plane parallel to the flat side of the chain link is bounded by two lines, one of which is an outer line and the other of which is an inner line. The outer line is consequently composed of two straight sections that are mutually parallel and two semicircular arcs, the diameter of which corresponds to the distance between the straight sections. The inner line runs the same distance away from the outer line at every point, corresponding to the wire diameter.

Such round link chains can be used for moving workpieces or as carriers. The carriers can be, for instance, pallets that are transported along a conveyance path. The chains also can be used as a load-carrying mechanism of a so-called chain hoist.

Round link chains are driven via chain sprockets, which cooperate in a positively engaged manner with the chain links. A distinction is made in this regard between vertical chain links and horizontal chain links. This distinction is made from the perspective of the chain sprocket. A horizontal chain link is understood to mean a chain link of which the flat side is turned towards the axis of rotation of the chain sprocket. A vertical chain link is a chain link for which the flat sides are perpendicular to the axis of rotation of the chain sprocket.

In previously common chain sprockets, only the horizontal chain links have been used to transmit the force from the chain sprocket to the chain. The vertical chain links have so far not been used for force transmission for chain sprockets and round link chains.

A chain sprocket is known from EP 0 269 557 A1 that is adapted to the change of chain pitch resulting from wear on the chain. When the chain under load passes over the chain sprocket, a movement occurs between adjacent chain links. The movement arises because the chain that is stretched under a load is forced by the chain sprocket into a circular path. The relative motion between the chain links causes frictional wear, with the result that the thickness of the chain link is reduced in the areas experiencing the friction. The thickness of the chain link is understood in the art to mean the diameter that the wire has at the point in question. The chain becomes longer due to the change of the chain link thickness, i.e., its periodicity no longer matches the pitch of the chain sprocket. To take this into account the chain pockets for the vertical chain links are specially formed in the known chain sprocket.

The chain pockets for the vertical chain links form a channel running in the circumferential direction of the chain sprocket that passes through the chain pockets for the horizontal chain links. The bottom of this groove describes an n-gon in the broadest sense, n being equal to the number of chain pockets for the horizontal chain links. Each of the sides of this regular n-gon is a circular arc segment with a constant radius of curvature that is very large with respect to the radius of curvature of the outer line of the individual chain link. The bottom of the pocket has no radius of curvature along its extent. It merely transitions at one end into a rounded corner of the n-gon, at which the next pocket bottom for the adjacent chain pocket of a vertical chain link begins. This corner can also be understood as a tooth in the broadest sense. The tip of the tooth is situated centrally, i.e., centered in the pocket for the horizontal chain link. It ends clearly below a plane that is defined by the flat side of the chain link closest to the axis of rotation.

FIG. 2 of the aforementioned EP 0 269 557 A1 shows the relationships between the vertical chain link and the associated chain pocket when a previously unused round link chain is used. The adjacent horizontal chain links hold the vertical chain link a distance above the bottom of the chain pocket for the respective vertical chain link. Only if the chain lengthens due to wear does a slight tilting of the vertical chain link occur, with the consequence that the chain link contacts the bottom of the pocket with its nose pointing in the load direction. The tangent at the contact point between the pocket bottom and the outer line of the chain link runs at a very acute angle to the longitudinal axis of the vertical chain link, whereby almost no force introduction from the chain sprocket to the round link chain via the point-shaped contact location is possible. The known chain sprocket is thus not capable of utilizing the chain to a higher degree than that which corresponds to the standards according to the safety limit values. The standards assume that the highest stress on the chain occurs in the area of the chain sprocket.

OBJECTS AND SUMMARY OF THE INVENTION

In view of the foregoing a general object of the present invention is to provide a chain sprocket that allows a higher load on a link chain of a given material compared to a prior art chain sprocket.

Applicants have discovered that a higher load/utilization of the chain is possible if the vertical chain links are also used for transferring force from the chain sprocket to the chain or vice versa. In order to achieve this, a load-receiving tooth flank which the vertical chain link contacts with its nose when loaded must be configured in a special manner.

The chain sprocket of the present invention can be used, like prior art chain sprockets, for driving round link chains or profiled steel chains, in particular, those of chain hoists. Each link of the link chain includes a bent wire section and has a flat shape. The shape is composed of two mutually parallel sections and two semicircular arcs.

The chain sprocket according to the invention includes a base body with an outer circumferential surface and an axis of rotation centered with respect to the outer circumferential surface. Chain pockets, situated in the outer circumferential surface and provided to accommodate the horizontal chain links in order to transfer force from the chain sprocket to the horizontal chain links, are contained in the base body.

The chain sprocket further contains chain pockets that are likewise situated on the outer circumferential surface and accommodate the vertical chain links. The number of chain pockets for the vertical chain links corresponds to the number of chain pockets for the horizontal chain links. Each chain pocket for the vertical chain links has contact areas against which the respective chain link can lie at least with a part of its straight section adjoining the circular arc. The chain pockets for the vertical chain links are each arranged between adjacent chain pockets for horizontal chain links and overlap them.

Radial teeth that are designed to transfer force from the chain sprocket to the vertical chain links project between adjacent chain pockets for vertical chain links. Each of the teeth is delimited by two tooth flanks facing in the circumferential direction. One of the two tooth flanks of each tooth is the load-receiving tooth flank, i.e. the tooth flank against which the vertical chain link lies under a corresponding load. This tooth flank faces in the direction opposite that of the load acting in the link chain under load.

Each load-receiving tooth flank defines a tooth flank line of curvature lying in the plane of symmetry that runs through the chain pocket for the vertical chain links and is perpendicular to the axis of rotation. This plane of symmetry coincides with the plane of symmetry of the vertical chain link and runs between the two lateral flank surfaces that are bounded by the vertical chain link. The term flank surface is understood as the surface which the chain link tangentially contacts at the respective flank.

The position of the load-receiving tooth flank is calculated such that, in the plane of symmetry, the line of curvature of the tooth flank is at a distance from the outer line facing in the load direction of the semicircular arc belonging to a chain link that is arranged in the chain pocket. This distance is present when the two adjacent chain links are centered and lying in their associated chain pockets without any effect of an external force.

Due to the distance between the line of curvature of the tooth flank and the outer line of the semicircular arc, both of which lie in the plane intersecting the axis of rotation at a right angle, a gap, curved in an arc shape and having a wedge shape whose width expands in the direction towards the tip of the tooth, is formed between the nose of the chain link and the adjacent tooth flank. This gap is dimensioned such that it closes when a predetermined force acting in the link chain is exceeded. This closure results due to the elastic deformation of the corresponding semicircular arc of the chain link.

In order to achieve an optimal force transmission to the vertical chain link, the tooth must have as high as possible a radial height. However, the radial height is limited by the chain ejector usually used in chain hoists and by the fact that the tangential run-off of the chain link from the chain sprocket must not be hindered. Favorable conditions result if, over a surface area that is defined by the flank surface area of the horizontal chain link into which the tooth projects, the tooth has a height between 0.16 and 0.75 times the thickness of the chain link. The tooth height is dependent on the thickness of the wire used for the chain links, as is easily seen.

A good force transmission between the round link chain and the tooth flank is achieved if the tooth flank is biaxially curved. Thereby, a favorable force distribution results, both in the tooth flank and in the nose of the chain link, because of the larger contact surface.

Biaxially curved is understood to mean a curvature whose associated center point of curvature lies on the line that runs parallel to the line of curvature of the tooth flank at a corresponding distance away from it. The radius of curvature measured with respect to this line is advantageously not smaller than half the diameter of the wire from which the chain link is manufactured.

The distance between the nose of the chain link and the load-receiving tooth flank, or between the outer line and the radius of curvature of the tooth flank, can be approximated by using two osculating circles. The one osculating circle is an approximation of the outer line of the semicircular arc of a vertical chain link inserted into the sprocket. Thereby a center point for the osculating circle is defined. The second approximation is a circle that approximates the line of curvature of the tooth flank and thus defines another center point. The center point of the osculating circle for the tooth flank is shifted in the load direction relative to the center point of the osculating circle for the chain link. The magnitude of the shift is in turn dependent on the wire thickness for the chain link and the length of the chain link. The two center points of the osculating circles advantageously lie on a straight line that runs parallel to the straight sections of the vertical chain link. Depending on the nature of the chain link, a run at an acute angle can also be advantageous.

The line of curvature of the tooth flank can be exactly circular, which simplifies the manufacture of the chain sprocket. The line of curvature of the tooth flank can also have the same profile that the outer line defines when the chain link is subjected to a given load, for instance the nominal load. When viewed more closely, the profile is then approximately parabolic, which still means, however, that here too an osculating circle can be defined over the length of the tooth flank's line of curvature. The osculating circle is then defined as the circular line at which the distances from the tooth flank's line of curvature are minimal, i.e., the circular line is a regression line. The distances here are measured with respect to the corresponding radii of the osculating circle.

In order to achieve as good a service life of the chain sprocket as possible, it is advantageous to maintain a certain elasticity and adaptability if the chain sprocket consists of a hardened steel, preferably case hardened, while wear resistance remains high.

A shaft borehole, with which the chain sprocket can be placed rotationally fixedly on the output shaft of a gearmotor, preferably passes through the chain sprocket.

The chain pockets for the horizontal chain links can be formed in a tub shape.

The chain pockets of the vertical chain links can be bounded by the load-receiving tooth flank, a tooth flank remote from the load-receiving tooth flank and belonging to an adjacent tooth, and by a pocket bottom. The pocket bottom can likewise be curved with the axis of curvature line being perpendicular to the axis of rotation. Another possibility is to use a pocket bottom that is flat and transitions at its area adjoining the load-receiving tooth flank into a curvature corresponding to that described above.

To avoid excessive stress on the chain link in the area of the weld, the pocket bottom can contain a recess for relieving the weld of the chain link.

The radius of the osculating circle for the tooth flank's line of curvature can be equal to or greater than that of the osculating circle for the semicircular arc's outer line. The position of the center points with respect to one another must be selected such that the pocket bottom runs tangentially, without an inflection point, into the tooth flank. The ratio of the two radii is in turn dependent on the wire diameter or the size of the chain link, and can lie between a factor of 1.0 and a factor of 1.2.

To improve the running of the vertical chain link onto and off of the load-receiving tooth flank, the load-receiving tooth flank preferably transitions in the vicinity of the crest of the tooth into a bevel. The bevel can have a curved or flat surface. The height of the bevel, measured in the radial direction of the tooth, preferably lies between 0.1 and 2 mm, preferably between 0.2 and 1.5 mm.

The description of exemplary embodiments below is limited to an explanation of the essential aspects of the invention. It will be clear to those skilled in the art that a number of variations are possible. Additionally, minor details that are not described can be inferred by a person skilled in the art from the drawings, which in this respect complement the description provided below.

Other objects and advantages of the invention will become apparent upon reading the following detailed description and upon reference to the drawings, in which:

BRIEF DESCRIPTION OF THE DRAWINGS

FIG. 8 is a table showing favorable dimensions for a chain sprocket according to the invention as a function of the chain parameters.

Figure 1:
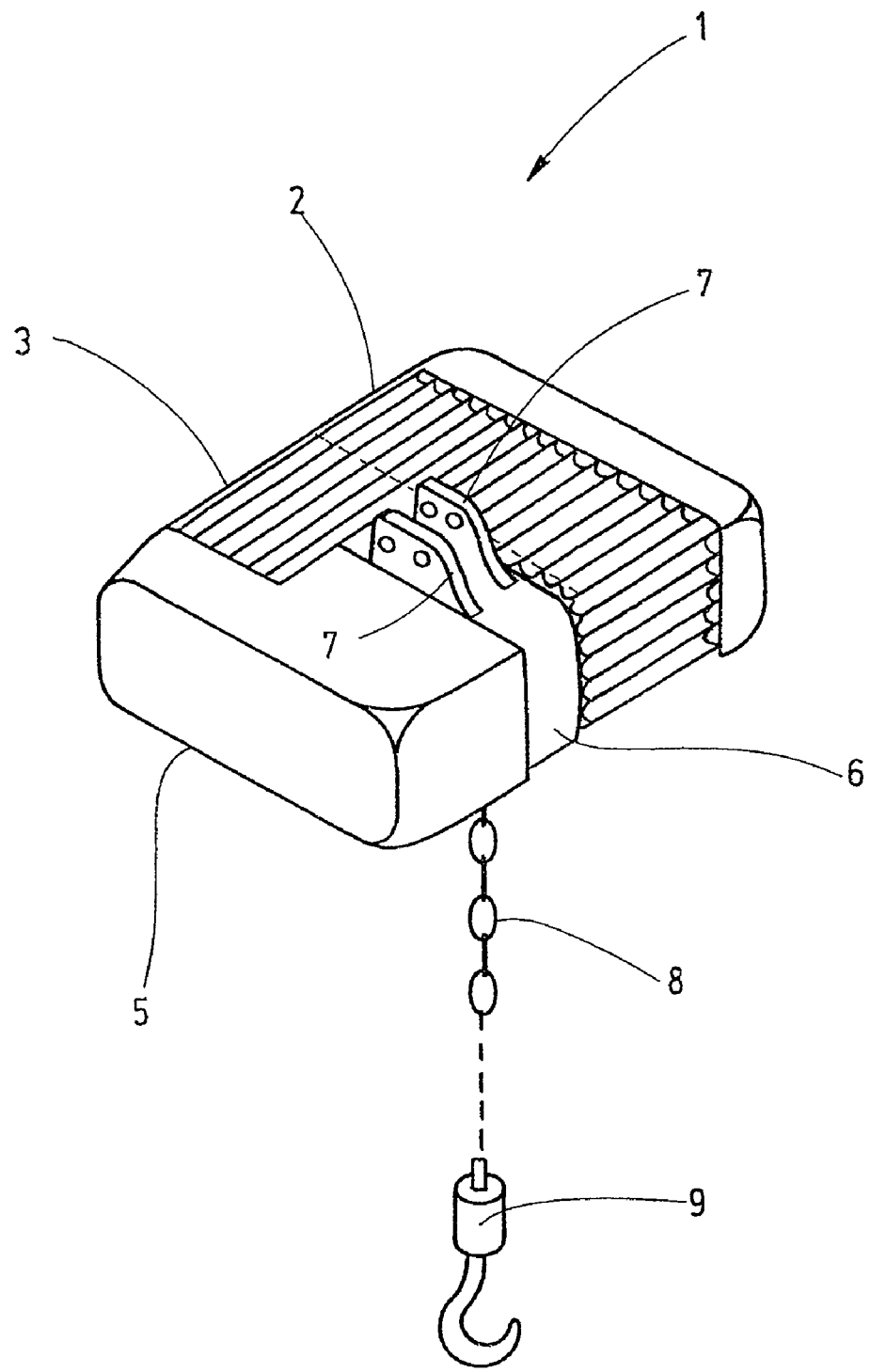
FIG. 1 is a schematic perspective view of an exemplary chain hoist.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring to FIG. 1 of the drawings, a chain hoist 1 is shown in a simplified perspective representation as an exemplary application of the present invention. The chain hoist 1 has a roughly block-shaped gear assembly housing 2, onto one end face of which an electric motor 3 in the form of asynchronous motor is flange-mounted. Both the gear assembly housing 2 and the motor 3 are provided with continuous cooling ribs, as can be seen in FIG. 1. A cover 5 containing the controller or essential parts of the controller is provided on the motor 3 on the side remote from the gear assembly housing 2. A chain sprocket housing 6, from the upper side of which brackets 7 project that serve for suspension of the chain hoist 1, is situated between the controller cover 5 and the opposing end face of the gear assembly housing 2. A round link chain 8, on the free end of which a hook 9 is mounted, extends down from the chain sprocket housing 6.

As can be appreciated from FIG. 1, only a force directed vertically downward ever acts in the round link chain 8. The direction of the force is independent of whether a load suspended from the hook 9 is to be pulled upward or prevented from falling downward. Even in a downward movement the force in the round link chain 8 acts in the same direction, and apart from the starting movement, with the same magnitude as in lifting.

Figure 2:
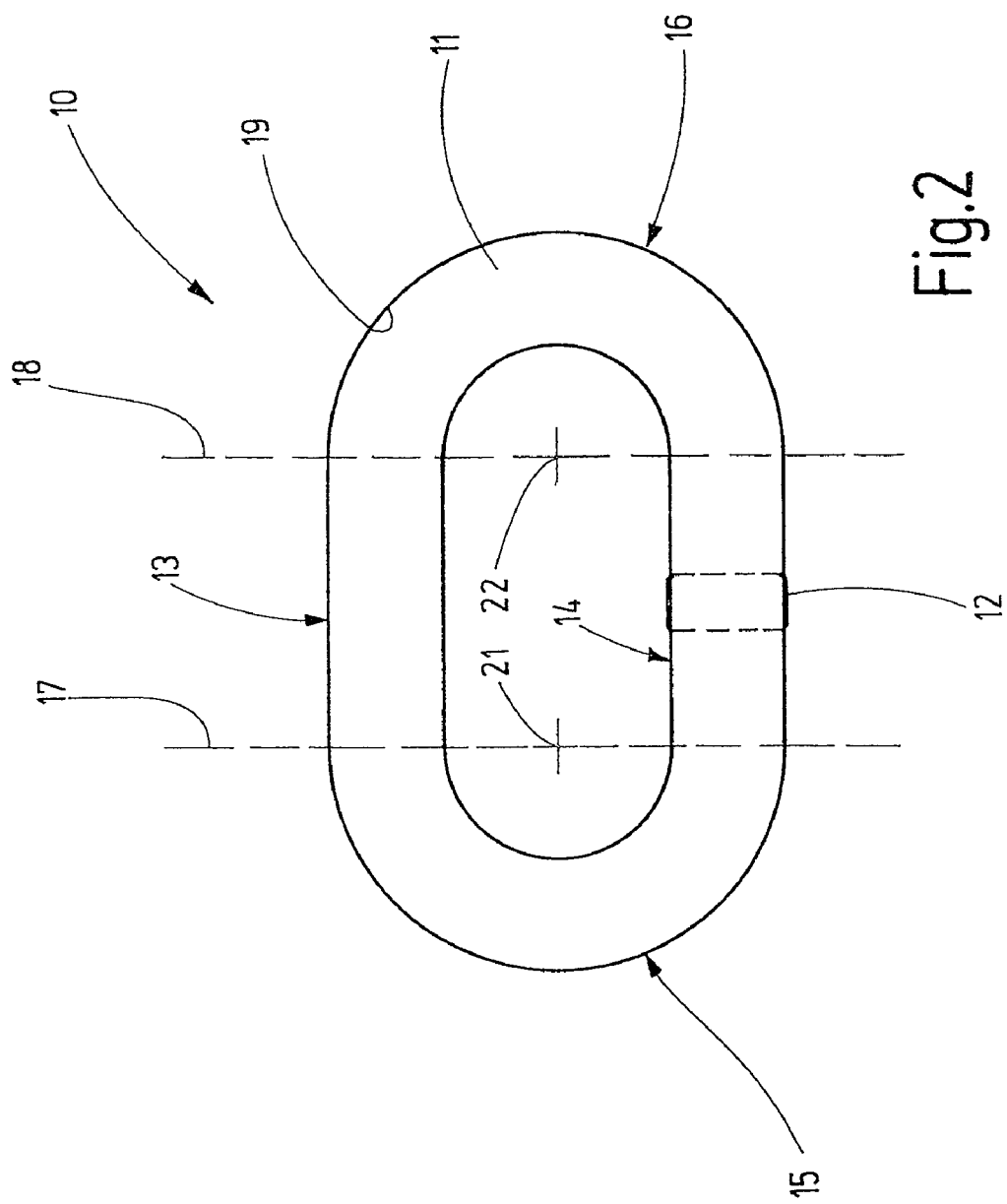
FIG. 2 is a plan view of a flank of an illustrative chain link.

The round link chain 8 is composed of a plurality of identical chain links 10, one of which is shown for the sake of example in FIG. 2. The illustrated chain link 10 consists of a round wire 11 with a suitable diameter that is bent into an oval. The wire section is butted at its ends and butt-welded at the location referenced as 12 in FIG. 2. Due to the type of curvature of the chain link, two mutually parallel sections 13 and 14 result as well as two semicircular arcs 15 and 16. The two semicircular arcs 15 and 16 transition at dashed lines 17 and 18 into curved sections 13 and 14. The outer contour of chain link 10 thus defines an outer line 19 running around the chain link. Because of this shape, outer line 19 describes a semicircle in the area of the two semicircular arcs 15 and 16, the center point of which lies on dashed lines 17 and 18, respectively, and is centered between the two straight sections 13 and 14. The center points are labeled 21 and 22 in FIG. 2. The chain links adjacent to the chain link illustrated in FIG. 2 would stand with their flat sides vertical with respect to the drawing plane if they were shown concatenated with the illustrated chain link.

Figure 3:
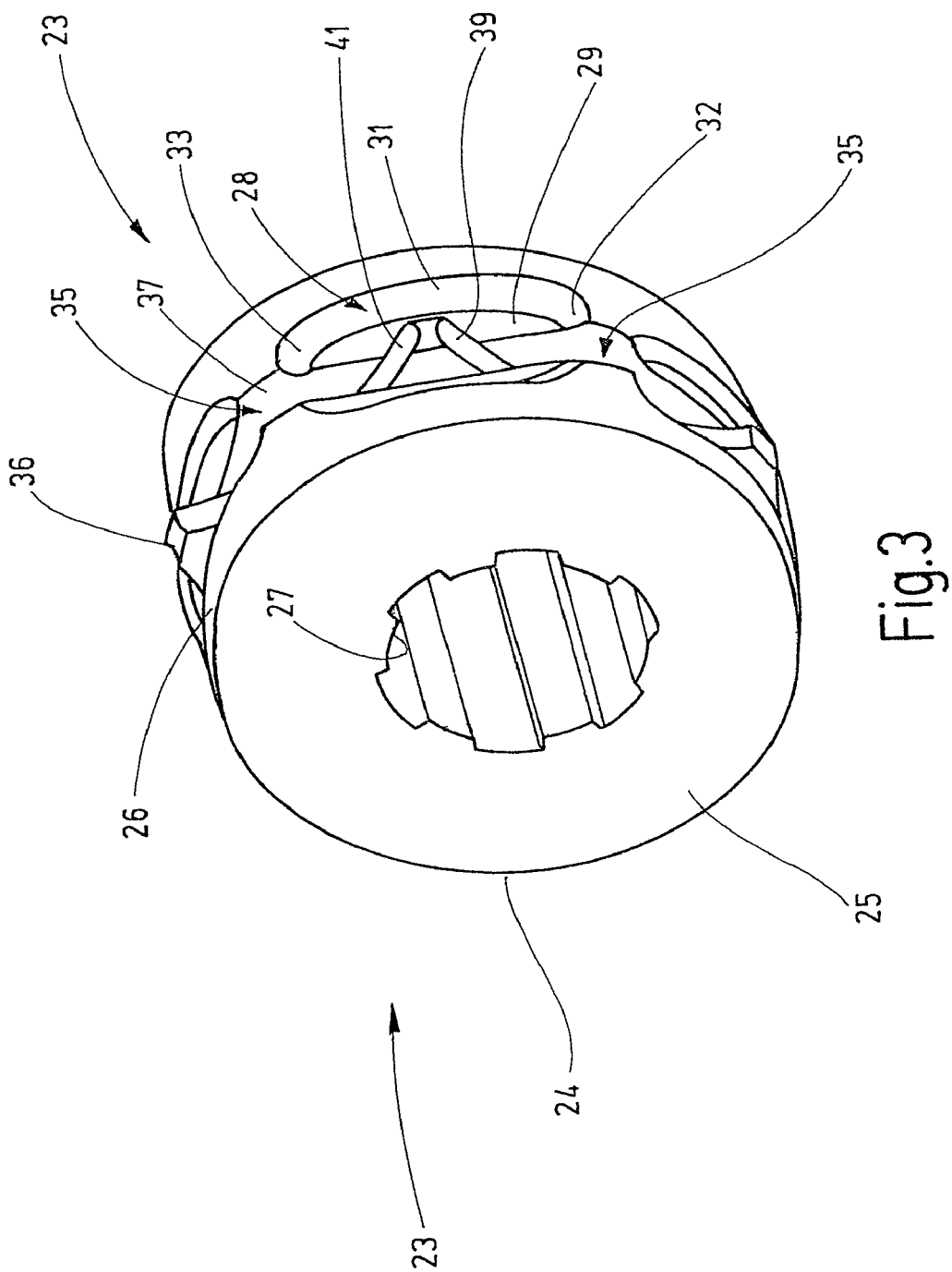
FIG. 3 is a perspective view of an illustrative chain sprocket according to the invention.
Figure 4:
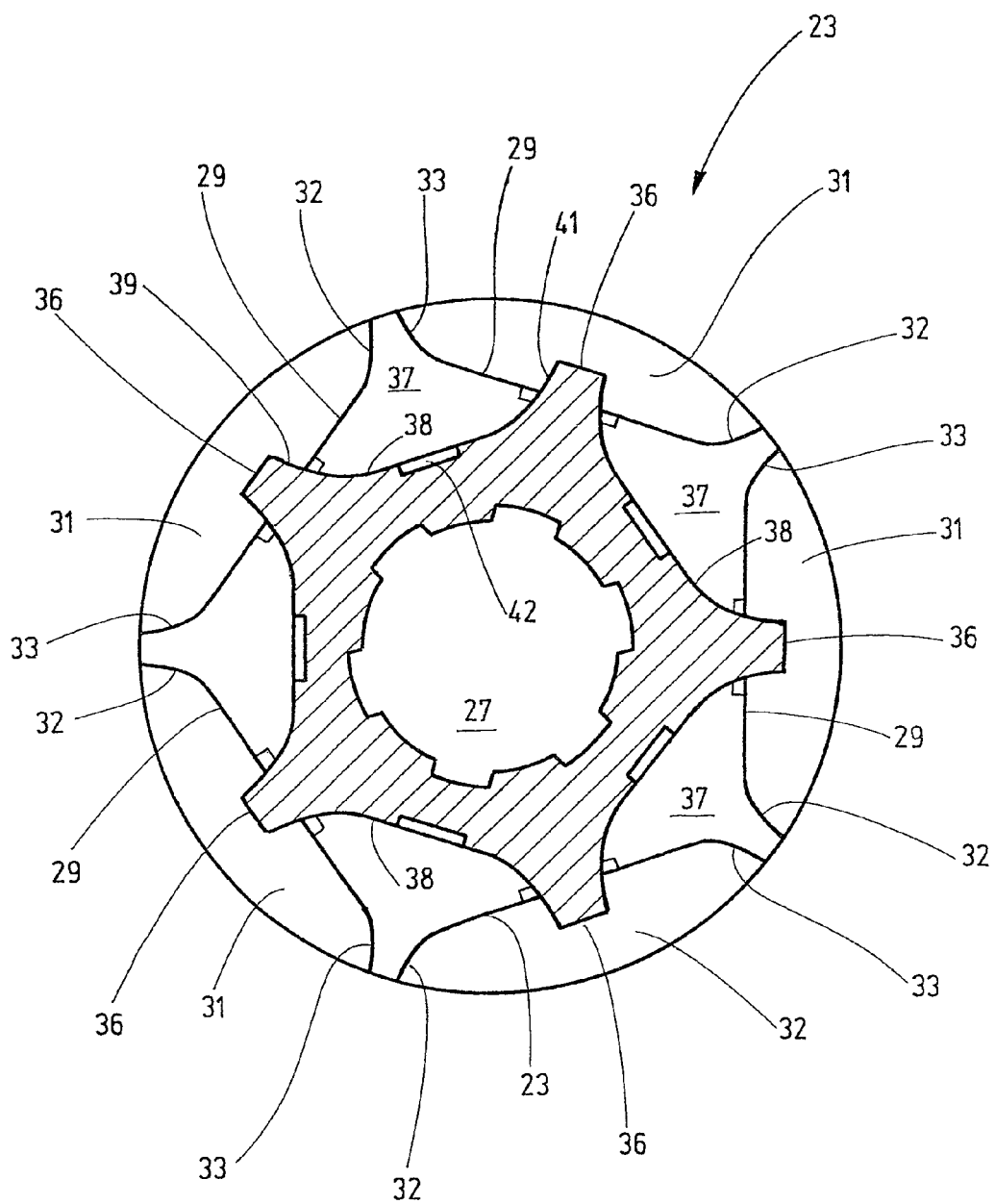
FIG. 4 is a cross-sectional view of the chain sprocket of FIG. 3 taken along a plane of symmetry of the chain pockets and perpendicular to the axis of rotation.

FIGS. 3 and 4 show a chain sprocket 23 of the type arranged in the chain sprocket housing 6 of the chain hoist of FIG. 1 and rotationally fixedly seated on the output shaft of the gear assembly 2. With the aid of this chain sprocket 23, which positively cooperates with the round link chain 8, the force issuing from the hook 9 is converted into a rotational movement in the output shaft or vice-versa.

The chain sprocket 23 includes a base body 24 in the shape of a short cylinder, which is bounded by two mutually parallel flat surfaces 25, of which only one can be seen in FIG. 3. A cylindrical circumferential surface 26 extends between the flat surfaces 25. A profiled passage opening 27 that penetrates the chain sprocket 23 from one flat surface 25 to the other one is provided coaxially to the circumferential surface 26. A rotationally fixed connection to the respective gear assembly output shaft is achieved with the aid of the profiling of the opening 27.

In the illustrated embodiment, a total of four chain pockets 28 for the horizontal chain links are provided one after another in the circumferential surface 26. The chain pockets 28 are distributed along the circumference equidistantly, coaxial to the passage opening 27. Their distance from one another corresponds to the spacing which the chain links 10 lying in chain pockets 28 would assume if the associated round link chain 8 is inserted without slack or tension. A horizontal chain link is understood by a person skilled in the art as a chain link that is oriented such that the flat side, which is turned towards the viewer of FIG. 2, faces the axis of rotation, i.e., the central axis of the passage opening 27.

The chain pockets 28 have an identical shape to one another. They are tub-shaped and are bounded by a pocket bottom 29 as well as a wall 31. The wall 31 ends at the height of the outer circumferential surface 26. The profile of the wall 31 corresponds to the profile of the outer line 19 of the chain link 10 situated therein. Transverse to the circumferential direction, the wall 31 forms contact or end faces 32 and 33 which the chain link 10 in question can contact with the outside of the circular arc 15 or 16 while under a load. The positively engaged cooperation between the chain sprocket 23 and the horizontal chain links 10 situated in the pockets 28 takes place via the end faces 32 or 33, depending on the direction of action. The pocket bottom 29 is even corresponding to the even flat side of the horizontal chain links 10.

Because of the crossed arrangement of the chain links of a round link chain, the chain links connecting the horizontal chain links must of necessity be arranged upright, i.e. their flat surface, which is parallel to the drawing plane of FIG. 2, stands perpendicular to the axis of rotation of the chain sprocket 23. In order to accommodate the vertical chain links 10, the chain sprocket 23 includes additional chain pockets 35 which correspond in number to the chain pockets 28 for the horizontal chain links. As shown in FIG. 3, the chain pockets 35 are arranged such that they overlap the chain pockets 28 in the circumferential direction. Conceptually the chain pockets 35 are composed of a groove running in the circumferential direction with a width corresponding to the thickness of the chain link 10, with teeth 36 project radially out of the groove at corresponding intervals. Thus, the pockets 35 likewise have a tub-like shape and are bounded by two mutually parallel flat side faces 37, of which only one can be seen in FIGS. 3 and 4. The distance of the side faces 37 from one another is somewhat greater than the thickness of chain link 10.

The teeth 36 can have a width in the area that projects radially above the surfaces 38 that is only slightly smaller than the clear distance between the straight sections 13 and 14 of the chain link 10. The chain pockets 35 are further bounded by a pocket bottom 38 and two tooth flank faces 39 and 41.

Since the vertical chain links are to be used according to the invention for force transmission between the chain sprocket 23 and the round link chain 8, and the force action always has the same direction, only one tooth flank is always load-receiving or load-transmitting. For the further explanation of the invention it may be assumed that this is tooth flank 39, which will therefore be referred to below as the load-receiving tooth flank.

Merely for completeness it may be mentioned that recesses 42 that accommodate the weld 12 can be contained in the pocket bottom 28. Thus, the boundary of each chain pocket 35 is composed of a flat pocket bottom 38, apart from recess 42, that smoothly transitions at both ends into the tooth flanks 39 and 41. On either side of the recess 42, the pocket bottom 38 forms straight sections, i.e., sections that lie on a tangent. In this case, straight does not necessarily mean flat. Just like the tooth flanks 39 and 41, the pocket bottom 38 can also comprise a curvature with respect to an axis that lies in the drawing plane of FIG. 4. In other words, the pocket bottom 38 can also be a hollow whose radius of curvature is slightly larger than the radius of curvature of the wire from which the chain link 10 is manufactured.

Figure 5:
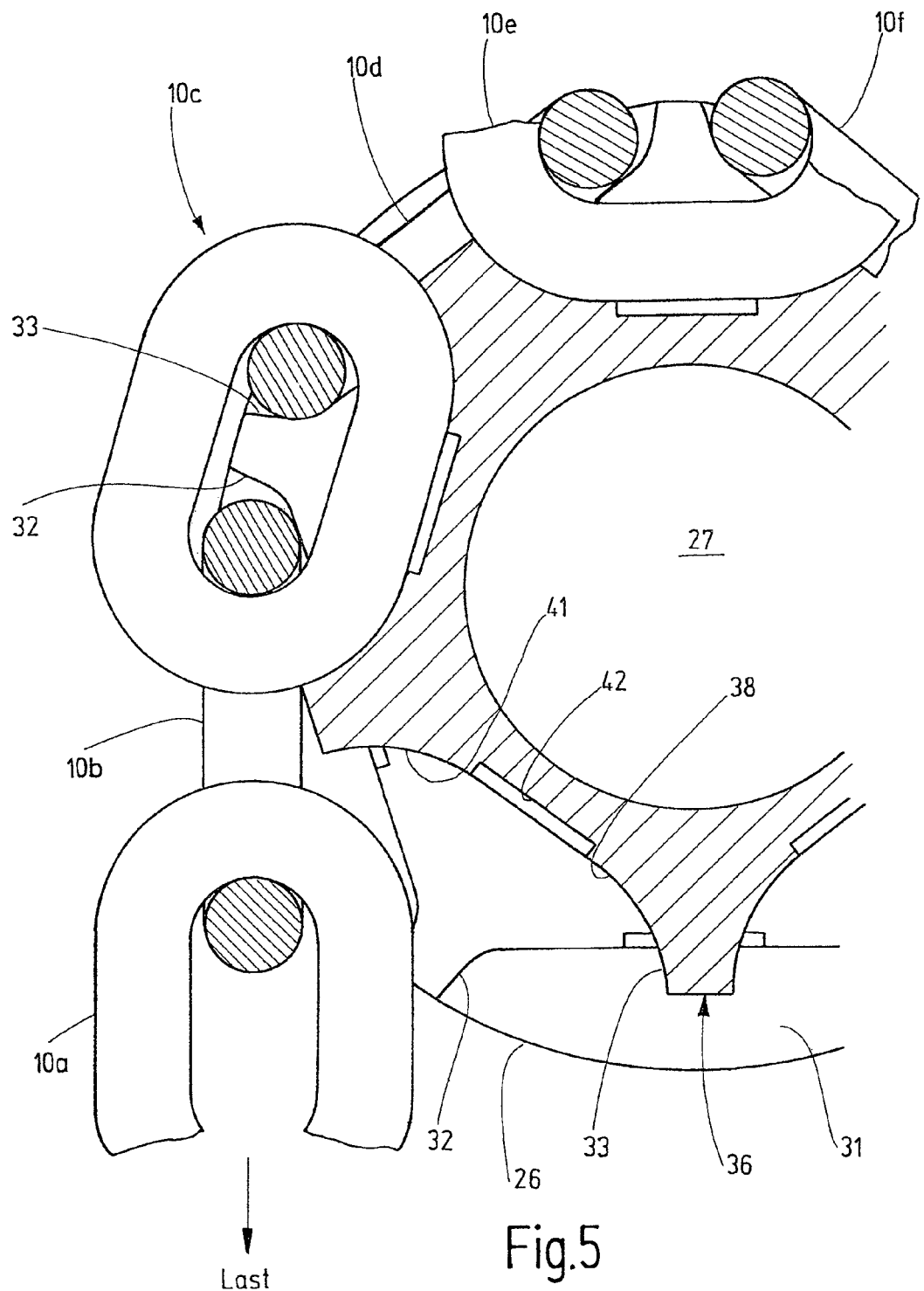
FIG. 5 is an enlarged, partial cross-sectional view of the chain sprocket of FIG. 3 taken in a plane perpendicular to the axis of rotation showing the interaction between the round link chain and the chain sprocket of the invention with the chain not under a load.

The cooperation of the round link chain 8 with the chain sprocket 23 can be understood with reference to FIG. 5. The plane of symmetry of the chain pockets 28, which is perpendicular to the axis of rotation of the chain sprocket 23, is simultaneously the plane of symmetry of the chain pockets 35 and also the plane of symmetry of the chain links 10 when they lie in the chain pockets 28 and 35. FIG. 5 shows the chain sprocket 23 cut along this plane of symmetry, as is illustrated in FIG. 4. The horizontal chain links 10 are likewise cut in this plane of symmetry, i.e., in a plane that is perpendicular to the drawing plane of FIG. 2 and passes through center points 21 and 22.

In FIG. 5, the chain links are labeled with the reference number 10 and additionally with lowercase letters to better distinguish them from one another. The description provided in connection with FIG. 2 applies to all of them.

As can be seen from FIG. 5, the round link chain runs counterclockwise tangentially off of the chain sprocket 23. Chain link 10a has already practically run off of the chain sprocket 23 and points downward in the direction of the load. Horizontal chain link 10b is connected to chain link 10d by concatenation with chain link 10c. As a result of the action of the load, chain link 10d is supported on the front wall 33 of the chain pocket 28. The next vertical chain link 10e rests roughly force-free in the next chain pocket 35 in the counterclockwise direction. This image continues until, in the area of the return strand of the round link chain 8, it lifts off of the chain sprocket 23 in order to run into a storage area not shown.

What is important for understanding the invention is that in which the round link chain 8 runs off of the chain sprocket 23 on the side of the load strand, and in particular where the uppermost horizontal chain link 10b is held by the vertical chain link 10c situated above it, without chain link 10b being able to support itself on other parts of the chain sprocket.

As can be understood from FIG. 5, the force transmission in the angular position of the chain sprocket 23 as shown takes place substantially by the positively engaging cooperation of the front wall 33 of the chain pocket 28 with the adjacent nose, i.e., the adjacent semicircular arc, of chain link 10c. Chain link 10d lies against the front wall 33 on both sides of the chain pocket 35 that cuts through the front wall 33.

Figure 6:
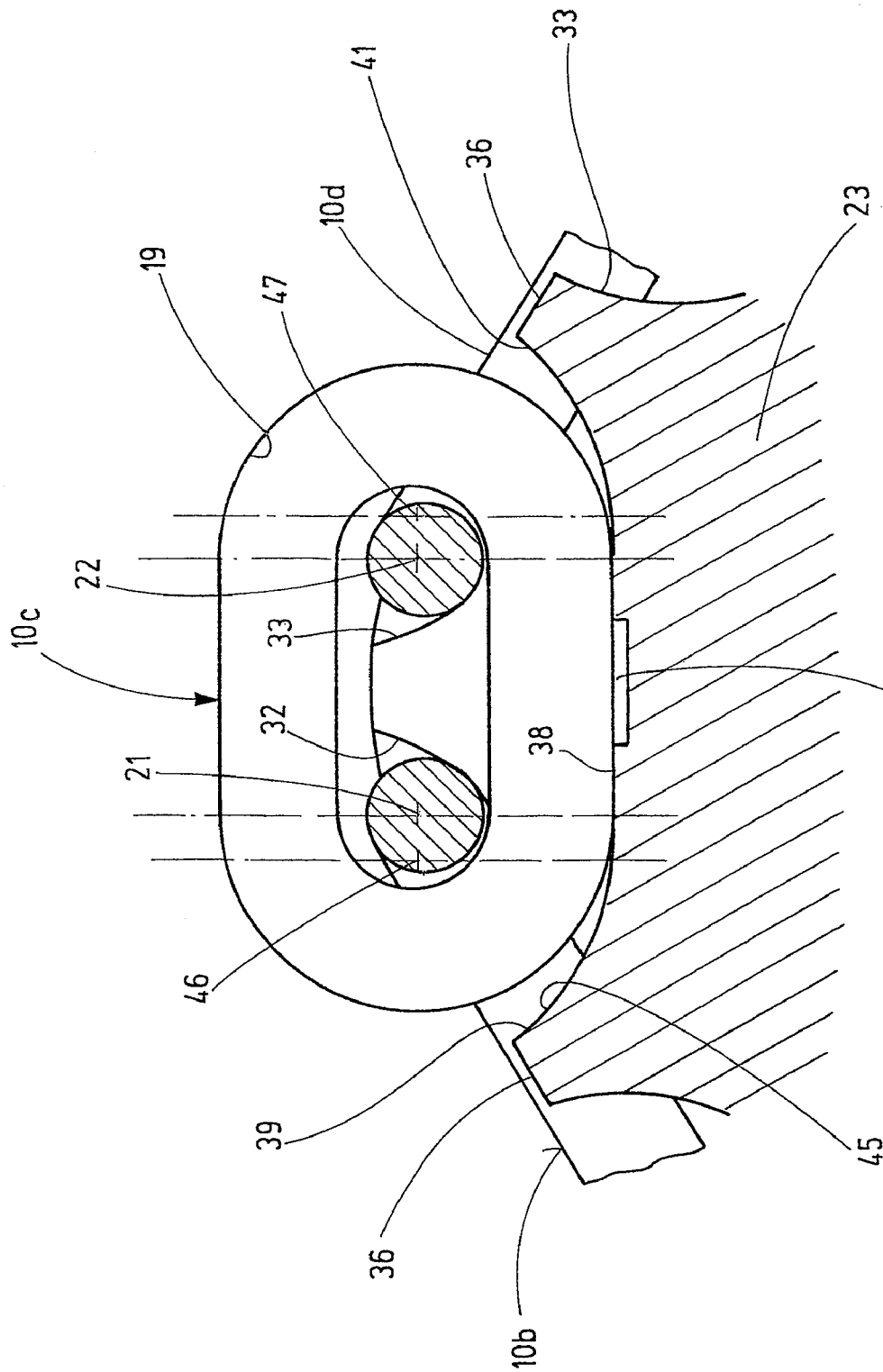
FIG. 6 is a further enlarged portion of the cross-sectional view of FIG. 5.

FIG. 6 shows, in an enlarged cross-sectional view, the engagement relationships between the nose of a vertical chain link, link 10c for example, and the load-receiving tooth flank 39 of the adjacent tooth 36. All details that are not important for understanding the engagement relationships have been omitted from FIG. 6. Moreover, the size relationships are greatly exaggerated in order for the engagement relationships to be more easily understood. The section through chain sprocket 23 lies in the plane of symmetry that is perpendicular to the chain sprocket's axis of rotation. This is the previously mentioned plane of symmetry that runs centrally between the two side faces 37 of the chain pocket 35. Thus it also runs, apart from the tilt play, centrally between the two mutually parallel side surfaces of chain link 10c. These surfaces are defined by the tangential plane that the chain link 10c run on both sides parallel to the drawing plane according to FIG. 2 or 6. In the illustrated section plane, the load-receiving flank surface 39 forms a tooth flank line of curvature 45 that directly opposes the outer line or outside contour line 19 in the circumferential direction (again apart from tilt play)

The tooth flank line of curvature 45 is a circular arc that reaches up to the tip of the adjacent tooth 36 and opens tangentially into the pocket bottom 38. The center point of this circle defining the tooth flank line of curvature 45 is the point marked 46, i.e., the center point 46 is shifted slightly, parallel to the pocket bottom 38, with respect to the center point 21 in the load direction. The amount of the shift, i.e., the distance between the two center points 21 and 46, is dependent on the dimensioning of the chain link 10. Favorable values for the distance a between the center points are listed in the table in FIG. 7 below as a function of the dimensioning of the chain link 10. The diameter of the circle that describes the tooth flank line of curvature has the same diameter as that of semicircular arc 16, 17.

In determining the dimensions of distance a, it was assumed that the round link chain was virgin, showing no signs of wear with the round link chain resting unforced on the chain sprocket 23, i.e., horizontal chain links 10b and 10d lie symmetrically in their chain pockets 28. Vertical chain link 10c is again symmetrically inserted between the latter two, so that the position of the center point 21 as the center of curvature of the outer line 19 is preserved in this manner.

As follows from the FIG. 8 table, the wedge shape that results from the center point shift is very small. It is ultimately dimensioned such that, under a nominal load on the chain in the situation as shown in FIG. 5, vertical chain link 10c immediately following horizontal chain link 10b is elongated by it with simultaneous elastic deformation. As a consequence of this deformation, vertical chain link 10c contacts the tooth flank 39 with its nose, i.e., the part of the semicircular arc facing in the direction of the load. That is to say, above this loading value the force transmission between the chain sprocket 23 and the round link chain 8 will also be transferred via the vertical chain links. Force transmission now no longer takes place exclusively via the horizontal chain links and the front contact surfaces 33, as was the case in prior art.

It has been shown that, for chain of identical quality, a chain can be utilized up to higher load values with this configuration. For example, compared to the nominal load otherwise, a risk-free load increase of up to 25% is possible with the chain sprocket of the present invention. It has further been shown that this novel chain sprocket brings increased safety and wears the chain less.

In the above description it was assumed that the chain 8 is a round link chain in which the individual chain links, as explained several times, are manufactured from a piece of round wire. It is accordingly advantageous if the load-receiving tooth flank 39 is biaxially curved. This means that it is curved corresponding to the osculating circle and that the generatrix for the load-receiving tooth flank 39 is a circular arc with a diameter that is somewhat larger than the diameter of the wire from which the round link chain is produced. The amount of surface pressure is markedly reduced. The same can be done in the area of the pocket bottom.

In the interest of increasing the carrying capacity of the link chain, efforts are under way to use a profile wire instead of a round wire for manufacturing the chain links. The profile wire is composed of a circular arc section and a section of a square. In other words, it has a square cross section in which the adjacent edges on one side are replaced by quarter-circles. The design of the load-receiving tooth flank 39 according to the present invention can be used with this type of chain as well. The load-absorbing surface is then no longer biaxially curved, as mentioned above in connection with the round link chain; instead the generatrix for the load-receiving surface 39 is a straight line that runs parallel to the axis of rotation along the tooth flank's line of curvature.

Finally, it is conceivable to use untreated steel of sufficient strength that is not subsequently heat-treated. In this respect, the costs are markedly lowered.

The chain sprocket that was shown is provided with boreholes in order to be pushed onto a shaft. It is also conceivable to construct the chain sprocket with an integrally projecting shaft.

It was assumed in the above description that only the tooth flank surfaces in one direction of rotation can be considered load-receiving flank surfaces and profiled and dimensioned according to the above-specified teaching. The profile of the opposing tooth flank surface, which does not receive a load in the respective direction of rotation, is largely irrelevant. It is dimensioned with regard to achieving as break-resistant a tooth root as possible.

If the strength of the tooth root is sufficient, it is also possible to construct the novel chain sprocket bidirectionally, i.e., to use the above-explained geometry and dimensioning not only on tooth flank surface 39, but also on tooth flank surface 41, and thus to use an osculating circle, the center point 47 of which is shifted in the other direction relative to the center point 22, if the load is not acting to the left relative to FIG. 6, but rather to the right.

Depending on the situation, it can be advantageous if the radius of the tooth flank line of curvature 45 is greater than the radius of the outer contour line 19. In this case, the center point 46 or 47 is shifted further upwards relative to the illustration. The amount of the shift ensures that tooth flank line of curvature 45 continues to run tangentially into the pocket bottom 38.

Figure 7:
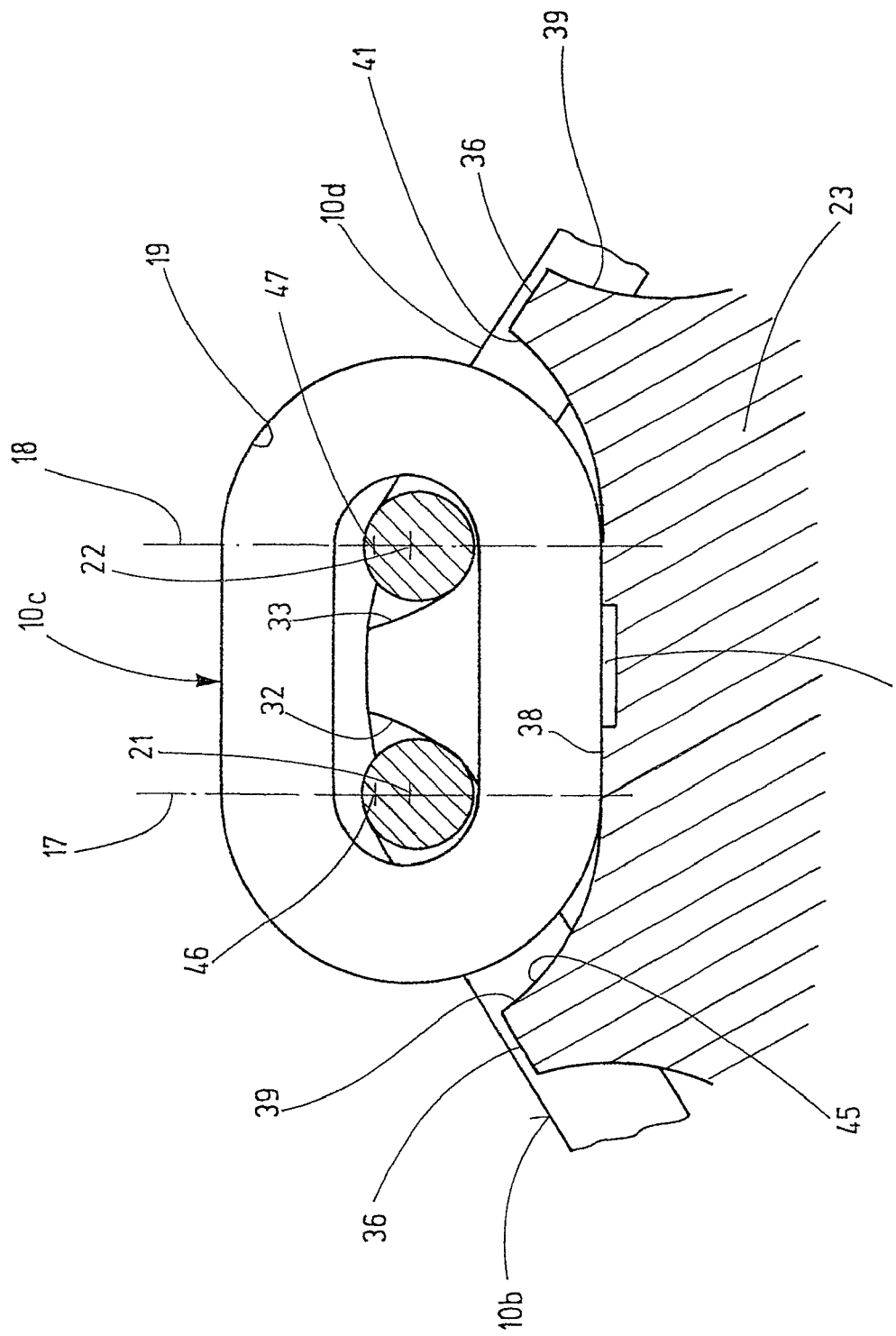
FIG. 7 is similar to FIG. 6 but showing a different design of the tooth flank.

FIG. 7 shows another embodiment of the invention. The required distance between the outer contour line 19 of chain link 10c and the adjacent tooth flank 39 or 41 is not achieved here by a shift of osculating circles as in the above example according to FIG. 6. Instead, the distance is achieved here in that the tooth flank line of curvature 45 defines an osculating circle whose radius is enlarged, according to Table 8, for example, with respect to the radius of the outer contour line 19 in the area of the semicircular arcs 16, 17.

Since inflection points, which could otherwise lead to indentations on the outside of chain link 10, must be avoided, the center point 46 is shifted on separating lines 17 or 18 away from pocket bottom 38. Thereby the pocket bottom 38 runs into the tooth flank line of curvature 45 with its straight section directly tangential, and thus free of inflection points. Center points 21 and 46 thus lie on separating line 17 that separates the semicircular arc 15 from the straight sections 12, 13, while curvature center point 47 lies on separating line 18 that separates the straight sections 13, 14 from the semicircular arc 16. The distance between center points 21, 46 and 22, 47, respectively, corresponds to the difference in radius. In other respects, the operation is as described in detail above.

Finally, it is also conceivable to dimension the tooth flank line of curvature not as a circular arc segment, but instead to give it a shape that the outer contour line 19 assumes in this area under load. In this case as well, osculating circles that are shifted with respect to one another according to FIG. 6 and the table of FIG. 8 can be defined both for the tooth flank line of curvature and for the outer contour line. These osculating circles represent approximation curves that can be obtained by a type of regression analysis according to the concept of least square errors, for example. The measurement of distances and fitting to the osculating circle is done starting from the radii of the respective imaginary circle. The table is calculated and tested for a nominal tension of 160 N/mm$^2$.

The height of each tooth 36 is subject to the conflicting priorities of good running characteristics of the chain 8 and maximization of the rotational path along which force is transferred between the chain sprocket and the vertical chain link. Favorable values for the height of the tooth 36 lie between 0.16 and 0.75 times the thickness of the wire from which the chain link 10 is manufactured. The height is measured as the distance between a plane and the tooth tip. The reference plane is the tangential plane at the lower flank surface of the horizontal chain link through which tooth 36 projects. The run-on and run-off conditions can be improved if the tooth 36 is provided with a bevel at its tip. The height or width of the bevel lies between 0.1 mm and 1.5 mm.

A chain sprocket for link chains, for example, round link chains or profiled steel chains, has been described that includes chain pockets for horizontal chain links. Chain pockets for vertical chain links are also provided. The chain pockets for the vertical chain links are separated from one another by teeth. The tooth flank surface of the tooth which a vertical chain link contacts under the effect of a load is dimensioned and profiled in a special manner. The dimensioning is such that up to a defined chain load the vertical chain link does not contact the tooth flank with its nose. A contact between the tooth flank surface and the nose of the respective chain link occurs only above a defined chain load.

The invention claimed is:

1. A chain sprocket for driving a link chain in which each chain link comprises a bent wire and has a flat shape including two mutually parallel sections and two semicircular arcs, the chain sprocket comprising:
   a base body having an outer circumferential surface and an axis of rotation,
   a plurality of first chain pockets situated in the outer circumferential surface for receiving horizontal chain links of the link chain and for transferring power from the chain sprocket to the horizontal chain links;
   a plurality of second chain pockets situated in the outer circumferential surface for receiving vertical chain links of the link chain, the second chain pockets corresponding in number to the first chain pockets for the horizontal chain links, each second chain pocket having support areas for the vertical chain links and against which at least a part of one of the parallel sections of the respective vertical chain link can bear;
   each second chain pocket being arranged between and intersecting each two adjacent first chain pockets for the horizontal chain links;
   a plurality of teeth with each being arranged between each two adjacent second chain pockets for the vertical chain links for transmitting force from the chain sprocket to the vertical chain links, each tooth being bounded by two tooth flanks that face in a circumferential direction of the base body;
   at least one of the two tooth flanks of each tooth comprising a load-receiving tooth flank that faces opposite a load direction of the link chain when the chain sprocket is being used;
   each load-receiving tooth flank defining a tooth flank line of curvature in a symmetry plane of the second chain pockets for the vertical chain links that is perpendicular to the axis of rotation, the tooth flank line of curvature approximately corresponding to a curved profile of an outer line of the adjacent semicircular arc, facing in the load direction, of a vertical chain link that is situated in the respective second chain pocket; and
   wherein the load-receiving tooth flank is positioned such that its tooth flank line of curvature, measured in the symmetry plane, is separated by a distance, at least in an area of a tip of the tooth, from an outer line of the semicircular arc of a link chain situated in the respective chain pocket, if the two adjacent chain links are centered and lie in their associated chain pockets without being acted on by an external force and there is no play between the chain links.

2. The chain sprocket according to claim 1, wherein each tooth has a height of between 0.16 and 0.75 times a thickness of a chain link over a surface defined by a flank surface of a horizontal chain link closest to the axis of rotation.

3. The chain sprocket according to claim 1, wherein the load-receiving tooth flank is biaxially curved.

4. The chain sprocket according to claim 3, wherein the load-receiving tooth flank has another curvature having a radius that is not smaller than half a diameter of the wire of the chain link.

5. The chain sprocket according to claim 1, wherein the outer line of the semicircular arc of a vertical chain link inserted into the chain sprocket defines a chain link osculating circle with a first center point and the tooth flank line of curvature of the load-receiving tooth flank defines a tooth flank osculating circle with a second center point and wherein the second center point of the tooth flank osculating circle is shifted with respect to first center point of the chain link osculating circle.

6. The chain sprocket according to claim 5, wherein the shift is in the load direction.

7. The chain sprocket according to claim 5, wherein a connecting line between the first and second center points extends parallel to the parallel sections of the vertical chain link.

8. The chain sprocket according to claim 5, wherein a connecting line between the first and second center points extends at an acute angle to longitudinal axes of the parallel sections of the vertical chain link.

9. The chain sprocket according to claim 5, wherein a connecting line between the first and second center points extends at a right angle to longitudinal axes of the parallel sections of the vertical chain link.

10. The chain sprocket according to claim 5, wherein a distance between the first and second center points of the osculating circles is between 0.06 and 0.1 times a diameter of the wire of the chain link.

11. The chain sprocket according to claim 5, wherein a first radius of the osculating circle of the tooth flank curvature line is larger than a second radius of the osculating circle of the outer line of the semicircular arc.

12. The chain sprocket according to claim 11, wherein the ratio of the first and second radii is between 0.08 and 0.3 times a diameter of the wire of the chain link.

13. The chain sprocket according to claim 11, wherein the ratio of the first and second radii is between a factor of 1.0 and a factor of 1.2.

14. The chain sprocket according to claim 1, wherein the tooth flank line of curvature is exactly circular.

15. The chain sprocket according to claim 1, wherein the tooth flank line of curvature has a profile the same as the outer line of the semicircular arc of a chain link that is under a nominal load and is adjacent to the load-receiving tooth flank.

16. The chain sprocket according to claim 1, wherein the chain sprocket is made of hardened steel.

17. The chain sprocket according to claim 1, wherein the base body contains a shaft bore for rotationally fixing an output shaft of a gearmotor.

18. The chain sprocket according to claim 1, wherein the first chain pockets for the horizontal chain links each have a tub-like shape.

19. The chain sprocket according to claim 1, wherein each second chain pocket for the vertical chain links is defined by the load-receiving tooth flank, a tooth flank of an adjacent tooth facing the load-receiving tooth flank, and a pocket bottom.

20. The chain sprocket according to claim 19, wherein the pocket bottom is curved with an axis of curvature lying at a right angle to the axis of rotation.

21. The chain sprocket according to claim 19, wherein the pocket bottom is flat.

22. The chain sprocket according to claim 19, wherein the pocket bottom has a center recess for relieving a weld of a link chain.

23. The chain sprocket according to claim 1, wherein the load-receiving tooth flank transitions in a direction towards the tip of the tooth into a bevel.

24. The chain sprocket according to claim 23, wherein the height of the bevel is between 0.1 and 1.5 mm.

25. The chain sprocket according to claim 1, wherein the chain sprocket has an integral shaft extension.

26. The chain sprocket according to claim 1, wherein, in an area that projects above a pocket bottom for a horizontal chain link, the teeth have a width that is slightly smaller than a clear distance between the parallel sections of the chain link.

27. The chain sprocket according to claim 1, wherein at a predetermined tension load of between 75% and 100% of a nominal tension of the link chain the distance between the tooth flank line of curvature and the outer line of the semicircular arc reaches zero.

28. The chain sprocket according to claim 27, wherein the nominal tension is between 320 N/mm$^2$ and 80 N/mm$^2$.

29. The chain sprocket according to claim 27, wherein the nominal tension is calculated based on a nominal loading capacity of a chain drive and a cross-sectional area of the wire of the chain link.

* * * * *